United States Patent Office 2,862,000
Patented Nov. 25, 1958

2,862,000

REACTION OF THIAZOLE SULFENYL HALIDES WITH ALPHA, BETA-OLEFIN NITRILES AND PRODUCTS

Samuel Allen Heininger and Gail H. Birum, Dayton, Ohio, assignors to Monsanto Chemical Company, St. Louis, Mo., a corporation of Delaware No Drawing. Application February 21, 1957
Serial No. 641,476

5 Claims. (Cl. 260—306.6)

This invention relates to thiazole reaction products and more particularly provides the products of reaction of thiazole-sulfenyl halides with $\alpha,\beta$-olefinic nitriles.

The $\alpha,\beta$-olefinically unsaturated nitriles are known to be resistant to reaction with sulfenyl halides. Thus, e. g., as reported by Kharasch and Buess, J. Am. Chem. Soc. (1949), vol. 71, page 2726, first column, whereas adducts of dinitrobenzenesulfenyl chloride with a number of different olefinic compounds have been prepared successfully by these workers, they found it impossible to effect the reaction of this sulfenyl halide with acrylonitrile. Turner and Connor, J. Am. Chem. Soc. (1947), 69, 1009, similarly report failure to produce addition of 4-chloro-2-nitrobenzenesulfenyl chloride and 4-nitrobenzenesulfenyl chloride to compounds in which the double bond was conjugated with a carbonyl, carbethoxyl or cyano group. Our own experiments have confirmed this finding that nitrobenzenesulfenyl halides do not react with acrylonitrile under conditions normally leading to adduct formation when the sulfenyl halide is contacted with other olefins. We have further made repeated attempts to react acrylonitrile with perchloromethyl mercaptan, a sulfenyl halide of the formula $Cl_3CSCl$, which is known to be highly reactive and to undergo ready reaction with a variety of unsaturated organic compounds, without success.

It is accordingly highly surprising that, as has now been found, $\alpha,\beta$-olefinically unsaturated nitriles undergo ready reaction with thiazolesulfenyl halides, forming reaction products consisting of compounds containing divalent sulfur atoms and nitrile radicals.

The presently preferred $\alpha,\beta$-olefinically unsaturated nitriles are nitriles of the formula $RCH=CRCN$ where R represents hydrogen or a hydrocarbon radical free of aliphatic unsaturation and containing from 1 to 6 carbon atoms, provided that at least one R represents hydrogen. By aliphatic unsaturation is here meant carbon-to-carbon, olefinic or acetylenic, unsaturation. Acrylonitrile, where each R represents a hydrogen atom, is the particularly preferred member of this series, but the present reaction also proceeds with facility with terminally unsaturated nitriles such as methacrylonitrile, 2-ethylacrylonitrile, 2-neopentylacrylonitrile, 2-cyclohexylacrylonitrile, 2-phenylacrylonitrile, etc. It may also be applied to $\beta$-hydrocarbylacrylonitriles such as crotononitrile, cinnamonitrile, 3-cyclohexylacrylonitrile, etc.

The presently preferred class of thiazolesulfenyl halides which undergo reaction with $\alpha,\beta$-olefinically unsaturated nitriles in accordance with this invention are the thiazolesulfenyl halides containing the molecular structure

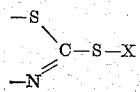

where X represents a halogen atom. The thiazolesulfenyl and arenethiazolesulfenyl chlorides and bromides are preferred. The presently useful sulfenyl halides may be readily derived from any 2-mercaptothiazole as, for example, by halogenation of a thiazolethiol to produce the corresponding sulfenyl halide, or from thiazyl disulfides by halogenation to produce the corresponding sulfenyl halide. Exemplary of presently useful thiazole-2-sulfenyl halides are, e. g., benzothiazole-2-sulfenyl chloride, benzothiazole-2-sulfenyl bromide, 4-methylthiazole-2-sulfenyl chloride, 4-phenylthiazole-2-sulfenyl chloride, naphthothiazole-2-sulfenyl chloride, 5-methylbenzothiazole-2-sulfenyl bromide, 6-methylbenzothiazole-2-sulfenyl chloride, 4,6-dimethylbenzothiazole-2-sulfenyl chloride, 4-methylbenzothiazole-2-sulfenyl chloride, etc.

When a thiazolesulfenyl halide as defined above is contacted with one of the presently useful class of olefinically unsaturated nitriles, there is formed a reaction product consisting of compounds containing sulfur atoms and nitrile radicals. We believe the primary reaction to be formation of an adduct as illustrated by the following equation:

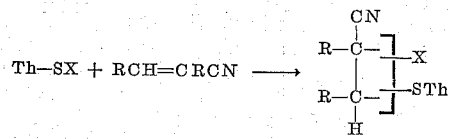

where $RCH=CRCN$ represents an $\alpha,\beta$-olefinic nitrile as defined above, and ThSX represents a thiazolesulfenyl halide. Our present products having the adduct structure shown above, may be characterized as 3(2)-halo-2(3)-(2-thiazylthio)alkanenitriles, where by such nomenclature is meant a 3-halo-2-(2-thiazylthio)alkanenitrile and/or 2-halo-3-(2-thiazylthio)alkanenitrile. Thus, the adduct of benzothiazolesulfenyl chloride and acrylonitrile is named as 3(2)-chloro-2(3)-(2-benzothiazolylthio)propionitrile and/or 2-chloro-3-(2-benzothiazolylthio)propionitrile.

Exemplary of the adducts which may be obtained from acrylonitrile and thiazolesulfenyl halides in accordance with this invention are 3(2)-chloro-2(3)-(2-thiazolylthio)propionitrile, 3(2) - bromo - 2(3) - (2-thiazolylthio)propionitrile, 3(2) - chloro - 2(3) - (4-methyl - 2 - thiazolylthio)propionitrile, 3(2) - chloro-2(3) - (4 - ethyl - 2 - thiazolylthio)propionitrile, 3(2)-chloro - 2(3) - (4 - phenyl - 2 - thiazolylthio)propionitrile, 3(2) - chloro - 2(3) - (2 - benzothiazolylthio)propionitrile, 3(2) - bromo - 2(3) - (2 - benzothiazolylthio)propionitrile, 3(2) - chloro - 2(3) - (5 - methyl-2 - benzothiazolylthio)propionitrile, 3(2) - chloro - 2(3)-(6 - methyl - 2 - benzothiazolylthio)propionitrile, 3(2)-bromo - 2(3) - (4,6-dimethyl - 2 - benzothiazolylthio) propionitrile, 3(2) - chloro - 2(3) - (4 - methyl - 6-chloro - 2 - benzothiazolylthio)propionitrile, 3(2) - chloro - 2(3) - (2 - naphthothiazolylthio)propionitrile, etc.

Exemplary of adducts obtained by addition of a thiazolesulfenyl halide to a beta hydrocarbyl acrylonitrile in accordance with this invention are 3(2)-chloro-2(3)-(2-thiazolylthio)butyronitrile, 3(2) - chloro - 2(3) - (2-benzothiazolylthio)butyronitrile, 3(2) - chloro - 2(3)-(2 - benzothiazolylthio) - 3 - phenylpropionitrile, 3(2)-bromo - 2(3) - (2 - benzothiazolylthio) - 3 - cyclohexyl-propionitrile, etc.

A further class of the present reaction products consists of those derived from $\alpha$-hydrocarbyl-substituted acrylonitriles and conforming to the above adduct formula, e. g., 3(2)-chloro-2(3)-(2-thiazolylthio)-2-methyl-propionitrile, 3(2) - chloro - 2(3) - (2 - benzothiazolylthio) - 2 - methylpropionitrile, 3(2) - chloro - 2(3) - (2-naphthothiazolylthio) - 2 - methylpropionitrile, 3(2)-bromo - 2(3) - (4 - methyl - 2 - benzothiazolylthio) - 2-butylpropionitrile, 3(2) - chloro - 2(3) - (2 - benzothiazolylthio) - 2 - hexylpropionitrile, 3(2) - chloro- 2(3) - (4 - ethyl - 2 - thiazolylthio) - 2 - phenylpropionitrile, etc.

It will be appreciated that the present adducts contain an asymmetric carbon atom and each position isomer is obtained as a racemic mixture of optical isomers which may be resolved into individual d- and l-isomers. The individual optical isomers are intended to be included by the above nomenclature.

While the present reaction is believed to yield adducts as described above, there are also apparently present in the reaction products additional thio-substituted nitriles not having the adduct structure and possibly resulting from secondary reactions such as dehydrohalogenation, etc., and the present adducts have proved refractory to attempted isolation thereof. Furthermore, the reaction product of an olefinic nitrile with a sulfenyl halide exhibits behavior, e. g., on oxidation, which does not conform in certain respects to the expected reactions of products predicted to be present therein. Accordingly, we prefer not to be bound by speculation, but to claim the present reaction products as such, as new compositions of matter.

In carrying out the present reaction, a thiazolesulfenyl halide as defined above is simply contacted with one of the presently useful class of olefinically unsaturated nitriles, until there is formed a reaction product consisting of compounds containing sulfur atoms and nitrile radicals. Heating and/or catalysts are desirably employed to accelerate the reaction, with pairs of reactants which react sluggishly; in other cases, the sulfenyl halide may react with the olefinic nitrile in an exothermic reaction, requiring cooling and/or diluents to moderate its rate. Suitable inert solvents and diluents which may be employed in the reaction mixture, if desired, include hydrocarbons such as benzene or hexane, halogenated solvents such as chloroform or ethylene dibromide, oxygenated solvents free of active hydrogen, such as ether, etc. A particularly preferred class of solvents are anhydrous organic carboxylic acids, e. g., glacial acetic acid; this solvent also has the advantage of acting as a catalyst for the reaction. Mixtures of carboxylic acid and solvents may also be used as a reaction medium if desired.

To accelerate the rate of reaction when desired, heating and catalysts are employed. Suitable temperatures for carrying out the reaction comprise, e. g., the reflux temperature of the reaction mixture. Acid catalysts which may be employed in the present reaction, in addition to the organic carboxylic acid catalysts mentioned above are, e. g., Friedel-Crafts catalysts such as aluminum trichloride or boron trifluoride complexes. Pressure variation may also be utilized to facilitate the conduct of the reaction, e. g., by carrying out the reaction in a pressure-resistant vessel under autogenous pressure and at elevated temperatures.

Since unsaturated nitriles, and especially acrylonitrile, are susceptible to thermal polymerization, the reaction is preferably conducted in the presence of polymerization inhibitors. Examples of suitable polymerization inhibitors are, e. g., hydroquinone, the monomethyl ether of hydroquinone, methylene blue, copper carbonate, selenium dioxide, etc.

The time required to accomplish the reaction depends on functional factors such as the reactivity of the $\alpha,\beta$-olefinic nitrile and the sulfenyl halide, the temperature of reaction, the presence or absence of catalysts, etc. Reaction rates and times of reactions may vary considerably, depending on details of apparatus and other operational conditions. By modification of the apparatus, continuous procedures may be substituted for the batch-type operations described below.

Conveniently, the course of the reaction may be followed by observing the change of color of the reaction mixture. Sulfenyl halides art generally a deep red shade; as the reaction with the nitrile proceeds, the color of the reaction mixture generally lightens gradually, usually reaching a clear yellow or orange tone by the time all the sulfenyl halide is reacted.

On completion of the reaction, the product may be separated by conventional methods, e. g., by evaporating off solvents, by distilling off or washing out catalysts, unreacted starting material, etc.

As illustrative of the process of the invention, there is described the following non-limiting exemplary operation.

*Example*

2-benzothiazolesulfenyl chloride was prepared by passing chlorine into a solution of 66.4 g. (0.2 mole) of 2,2'-dithiobis-(benzothiazole) in 350 ml. of carbon tetrachloride. Fifty-three grams (1.0 mole) of acrylonitrile were added batchwise to the resulting solution, a yellow-orange precipitate being formed as the acrylonitrile was added. When the addition was complete, the reaction mixture was refluxed for one hour and a half and then let stand at room temperature overnight. The reaction product was obtained as a yellow solid which was filtered off and dried: 59.5 g. yellow crystals, M. 145–150° C., analyzing as follows: 43.63% carbon, 2.59% hydrogen, 18.13% chlorine, 8.38% nitrogen, 28.28% sulfur.

To the best of our knowledge, the presently provided reaction products of sulfenyl halides with nitriles of the above formula are complex mixtures of isomeric saturated and unsaturated compounds as indicated hereinabove. The constituents are difficultly separable and the composition of the present reaction products has not been precisely established. The reaction products are adapted for use as the active constituents of microbiological toxicant compositions. This utility was illustrated by incorporating the reaction product of 2-benzothiazolesulfenyl chloride with acrylonitrile in sterile agar at a concentration of about 0.1% whereby the agar was rendered incapable of supporting the growth of fungal species such as *Aspergillus niger*, when inoculated therewith, and bacterial species such as *Microccocus pyogenes* var. *aureus* and *Salmonella typhosa* in sterile agar will in like manner be inhibited from growing. The present reaction products may also be incorporated in the habitat of nematodes such as *Panagrellus redivivus* or *Meloidogyne sp.*, wherein control has been shown at concentrations on the order of 0.1%. These reaction products are also useful as insecticides and have been shown to have activity as contact herbicides. In addition to the direct addition of the present reaction products to the habitat supporting the undesirable pest life, they may also be diluted with organic solvents admixed with surface-active agents, with or without the addition of organic solvents, to prepare concentrates which can be diluted with water to give aqueous dispersions or emulsions or incorporated with finely divided inert powders, to form toxic compositions for application to pest habitats or to pest species. The present reaction products may be utilized to render organic substrates resistant to microbiological attack, e. g., they may be applied on leather, cloth etc., or added to paints and lacquers, starch pastes, creams, and so forth.

It is also contemplated that the presently provided sulfur-containing reaction products of thiazolesulfenyl halides with $\alpha,\beta$-olefinic nitriles may be converted by oxidation (e. g., with hydrogen peroxide in acetic acid, potassium permanganate, chromic acid, etc.) into the corresponding sulfoxides and sulfones.

While the present invention has been illustrated with reference to specific materials and processes, it will be appreciated that other embodiments of the invention may be made as defined in the appended claims.

What is claimed is:

1. The method which comprises contacting a 2-thiazole-sulfenyl halide selected from the class consisting of thiazole-, methyl-substituted thiazole-, phenyl-substituted thiazole-, benzothiazole-, methyl-substituted benzothiazole- and naphthothiazole - 2 - sulfenyl chlorides and bromides, with an α,β-olefinically unsaturated nitrile of the formula RCH=CRCN where R represents a substituent selected from the class consisting of hydrogen and hydrocarbon radicals free of aliphatic unsaturation and containing from 1 to 6 carbon atoms, provided that at least one R represents hydrogen, and thereby forming a reaction product comprising compounds containing divalent sulfur atoms and nitrile radicals.

2. The method of claim 1, wherein said reaction is carried out in the presence of glacial acetic acid as catalyst.

3. The method which comprises contacting 2-benzothiazolesulfenyl chloride with acrylonitrile and thereby forming a reaction product comprising compounds containing divalent sulfur atoms and nitrile radicals.

4. A mixture of isomers of compounds of the formula

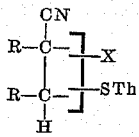

and dehydrohalogenation products thereof where X is selected from the class consisting of chlorine and bromine, R is selected from the class consisting of hydrogen and hydrocarbon radicals free of aliphatic unsaturation and containing from 1 to 6 carbon atoms, provided that at least one R represents hydrogen, and Th is a 2-thiazole radical selected from the class consisting of thiazyl, methyl- and phenyl-substituted thiazyl, benzothiazyl, methyl-substituted benzothiazyl, and naphthothiazyl.

5. A mixture of isomers and dehydrohalogenation products of compounds of the formula

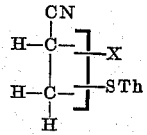

where Th is benzothiazyl.

No references cited.